(12) United States Patent
Shimojou et al.

(10) Patent No.: US 10,356,663 B2
(45) Date of Patent: Jul. 16, 2019

(54) SERVICE ALLOCATION DETERMINING METHID

(71) Applicant: NTT DOCOMO, INC., Chiyoda-ku (JP)

(72) Inventors: Takuya Shimojou, Chiyoda-ku (JP); Motoshi Tamura, Chiyoda-ku (JP); Masayoshi Shimizu, Chiyoda-ku (JP); Ashiq Khan, Chiyoda-ku (JP); Shigeru Iwashina, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 15/752,478

(22) PCT Filed: Sep. 15, 2016

(86) PCT No.: PCT/JP2016/077296
§ 371 (c)(1),
(2) Date: Feb. 13, 2018

(87) PCT Pub. No.: WO2017/057025
PCT Pub. Date: Apr. 6, 2017

(65) Prior Publication Data
US 2019/0014504 A1 Jan. 10, 2019

(30) Foreign Application Priority Data
Sep. 30, 2015 (JP) .................... 2015-194105

(51) Int. Cl.
*H04W 24/02* (2009.01)
*H04W 28/24* (2009.01)
*H04L 12/927* (2013.01)

(52) U.S. Cl.
CPC ........... *H04W 28/24* (2013.01); *H04L 47/805* (2013.01); *H04W 24/02* (2013.01)

(58) Field of Classification Search
CPC ...... H04W 28/24; H04W 24/02; H04L 47/805
See application file for complete search history.

(56) References Cited

U.S. PATENT DOCUMENTS 9,111,288 B2 * 8/2015 Paul ...................... G06Q 30/02
9,286,007 B1 * 3/2016 Bono .................... G06F 3/0689
(Continued)

FOREIGN PATENT DOCUMENTS

JP 2014-45390 A 3/2014
JP 2014-130474 A 7/2014

OTHER PUBLICATIONS

Ono, Kanichiro, "Multi Service Fabric (MSF) Realizing Flexible Operations and Services with New Network Configuration/Control Technology", Business Communication, vol. 52, No. 7, (2015), pp. 10-13, with a Partial English Translation.
(Continued)

*Primary Examiner* — Brandon J Miller
(74) *Attorney, Agent, or Firm* — Oblon, McClelland, Maier & Neustadt, L.L.P.

(57) ABSTRACT

A slice allocating method capable of dynamically changing a service and a slice to be allocated to the service is provided. An OSS/BSS holds allocation service information in which a service to which a slice has been allocated is associated with the slice. Further, a request reception unit of the OSS/BSS receives an SLA-SL which is a requirement of a function. An allocation determination unit determines a slice having an SLA-SL corresponding to a service requirement of the received service. When the service of the slice determined by the allocation determination unit is the same as the service associated with the slice in advance, an allocation request unit reallocates the service to the determined slice.

6 Claims, 16 Drawing Sheets

(56) References Cited

U.S. PATENT DOCUMENTS

| | | | | |
|---|---|---|---|---|
| 2012/0051296 A1* | 3/2012 | Kokku | .................. | H04W 28/26 370/329 |
| 2013/0007232 A1* | 1/2013 | Wang | .................. | H04L 63/0272 709/222 |
| 2017/0048021 A1* | 2/2017 | Yanovsky | ......... | G06F 17/30197 |
| 2018/0242161 A1* | 8/2018 | Vulgarakis Feljan | ....................... | H04W 16/10 |

OTHER PUBLICATIONS

Written Opinion dated Dec. 6, 2016 in PCT/JP2016/077296 with English translation.

Extended European Search Report dated Jul. 31, 2018 in Patent Application No. 16851199.6.

"Network slicing—service/traffic dependent selection", NTT DOCOMO, 3GPP TSG-SA WG1 Meeting #71, S1-152156, 8.1, Aug. 2015, XP050990407A, 3 pages.

Office Action dated Jun. 26, 2018 in Japanese Patent Application No. 2017-543125 (with English language translation) citing document AO therein, 11 pages.

Office Action dated Jan. 22, 2019 in Japanese Patent Application No. 2017-543125 (with English translation, citing reference AO therein).

International Search Report dated Dec. 6, 2016, in PCT/JP2016/077296 filed Sep. 15, 2016.

Nakao, Akihiro, "Virtual Node Project: Virtualization Technology for Building New-Generation Networks", NICT News, No. 393, (2010), pp. 1-10.

Ono, Kanichiro, "Multi Service Fabric (MSF) Realizing Felxible Operations and Services with New Network Configuration/Control Technology", Business Communication, vol. 52. No. 7, (2015), pp. 10-13, with a Partial English Translation.

Office Action dated Jun. 26, 2018 in Japanese Patent Application No. 2017-543125 (with English language translation) 11 pages.

English translation of the International Preliminary Report on Patentability dated Apr. 5, 2018 in PCT/JP2016/077296 filed Sep. 15, 2016, 8 pages.

Takeshi Ogura, et al., "A Method for Congestion Avoidance Using Multiple Virtual Networks" The Institute of Electronics, Information and Communication Engineers, IEICE Technical Report, Nov. 2012, 11 Pages (with partial English translation).

Hirotada Honda, et al., "On Resource Allocation for Virtuyal Network Embedding" The Institute of Electronics, Information and Communication Engineers, IEICE Technical Report, vol. 115, No. 11, Apr. 14, 2015, pp. 15-20 (with partial English translation).

Office Action dated Apr. 2, 2019 in Japanese Application No. 2017-543125 (w/English translation).

\* cited by examiner

| Service slice | Resource slice | Function set | SLA-SL |
|---|---|---|---|
| S-slice1 | R-slice1 | SGW0001, HSS0001,... | Mobility=1, Latency=2, Throughput=1, Security=1... |
| S-slice2 | R-slice2, R-slice3 | SGW0002, HSS0002,... | Mobility=3, Latency=3, Throughput=3, Security=3... |

(B)

| Service parameter | Service slice | SLA-SL |
|---|---|---|
| Smart meter, Road sensor,... | S-slice1 | Mobility=1, Latency=2, Throughput=1, Security=1... |
| Connected car | S-slice2 | Mobility=3, Latency=3, Throughput=3, Security=3... |

*Fig.6*

| Service parameter | SLA-SL |
|---|---|
| Smart meter | Mobility 1、··· |
| Connected car | Mobility 3、··· |

*Fig.7*

| S-slice ID | R-slice ID | Function set |
|---|---|---|
| 1 | 1 | SGW0001, PGW0001, ... |
| 2 | 2,3 | SGW0002, PGW0002, ... |

Fig.8

| Function | SLA-SL |
|---|---|
| SGW0001 | Mobility 1 |
| SGW0002 | Mobility 3 |
| PGW0001 | Latency 2 |

*Fig.9*

| User ID | service parameter |
|---------|-------------------|
| AAA BBB ... | car video ... |

Fig.10

| service parameter | IP address |
|---|---|
| car video | XX.XX.XX.XX |
| ... | YY.YY.YY.YY |
|  | ... |

Fig.11

| Function | VM |
|---|---|
| SGW0001 | VM3 |
| HSS0002 | VM4 |

Fig.12

| VM | AFFILIATION HW | Usage |
|---|---|---|
| VM1 | PM1 | 30% |
| VM2 | PM2 | 50% |

Fig.13

| HW | Usage |
|----|-------|
| PM1 | 90% |
| PM2 | 10% |

SERVICE ALLOCATION DETERMINING METHID

TECHNICAL FIELD

The present invention relates to a method of determining a slice to which a service is allocated.

BACKGROUND ART

A network system using a virtualization technology in the related art generates a slice that is a virtual network that is logically generated on a network infrastructure by virtually separating hardware resources using a virtualization technology disclosed in Non-Patent Document 1. By allocating services to the corresponding slices, the services can be provided using independent slice networks. Thus, when the slices are allocated to the respective services having various requirements, it is possible to easily satisfy the requirements of each service and to reduce signaling processing or the like.

CITATION LIST

Non Patent Literature

[Non-Patent Literature 1] Akihiro Nakao, "Research on Virtualization Node/Project Virtualization Technology For New-Generation Networks", [online], June 2010, National Institute of Information and Communications Technology, [accessed on Mar. 16, 2015], Internet. <http://www.nict.go.jp/publication/NICT-News/1006/01.html>

SUMMARY OF INVENTION

Technical Problem

However, when a service is uniquely allocated to a slice, the service is not always allocated to the appropriate slice in a case in which the requirements of the service dynamically change or a case in which a status of resources providing the slice changes. Further, from the viewpoint of efficiency of use of resources, fixing the slices may not be appropriate.

The present invention has been made in view of the above, and an object of the present invention is to provide a slice allocating method for dynamically changing a service, and a slice that is allocated to the service.

Solution to Problem

In order to achieve the above object, a service allocation determining method according to an embodiment of the present invention is a service allocation determining method executed by a device that allocates a service that uses a virtual network to a slice that is the virtual network generated on a network infrastructure, wherein in the device, a service to which the slice is allocated is associated with the slice, and the method comprises a determination step of determining a slice that satisfies a service requirement that is a requirement of a function in a service that is an allocation target; and an allocation step of reallocating, when the service that is the allocation target is associated with a slice by the device in advance, the service that is the allocation target to the slice determined in the determination step.

According to the service allocation determining method, since the service is reallocated to the slice that satisfies the service requirement, the service can be reallocated to a slice that satisfies a changed service requirement if a service requirement has changed. Thus, it is possible to dynamically change the slices to be allocated to correspond to a service requirement that has dynamically changed, and to provide an appropriate service.

In the service allocation determining method, the service that is the allocation target may be reallocated by changing a communication control device that transmits and receives data for using the service. In this case, since the communication control device that transmits and receives data of the service is switched according to the service requirement, it is possible to provide a suitable service to a user who uses the service.

The service allocation determining method may further includes an acquisition step of acquiring a resource status for each slice and a service requirement of a service to which the slice has already been allocated, wherein the determination step may determine a slice to be allocated on the basis of the service requirement and the resource status acquired in the acquisition step. In this case, since the slice to be allocated to the service is determined on the basis of the service requirement and the resource status information of the service to which the slice has already been allocated, an appropriate slice can be dynamically allocated even when the resource status fluctuates.

Further, in the service allocation determining method, the determination step may determine a slice having a largest number of available resources among slices satisfying the service requirement. In this case, since the service is allocated to the slice of the resource having the largest number of available resources, it is possible to effectively utilize the resources.

Advantageous Effects of Invention

According to the present invention, it is possible to dynamically change the slices to be allocated to correspond to a service requirement that has dynamically changed, and to provide an appropriate service.

BRIEF DESCRIPTION OF THE DRAWINGS

FIG. 3 is a diagram illustrating an overview of an allocating method on the basis of service requirements.

FIG. 5 is a hardware configuration diagram of OSS/BSS or the like.

FIG. 6 is a diagram illustrating a requested service table.

FIG. 7 is a diagram illustrating a function set table.

FIG. 8 is a diagram illustrating a function requirement table.

FIG. 9 is a diagram illustrating a user service usage table.

FIG. 10 is a diagram illustrating a service parameter address table.

FIG. 11 is a diagram illustrating a VM function table.

FIG. 12 is a diagram illustrating a VM usage table.

FIG. 13 is a diagram illustrating a hardware usage table.

DESCRIPTION OF EMBODIMENTS

Figure 1:
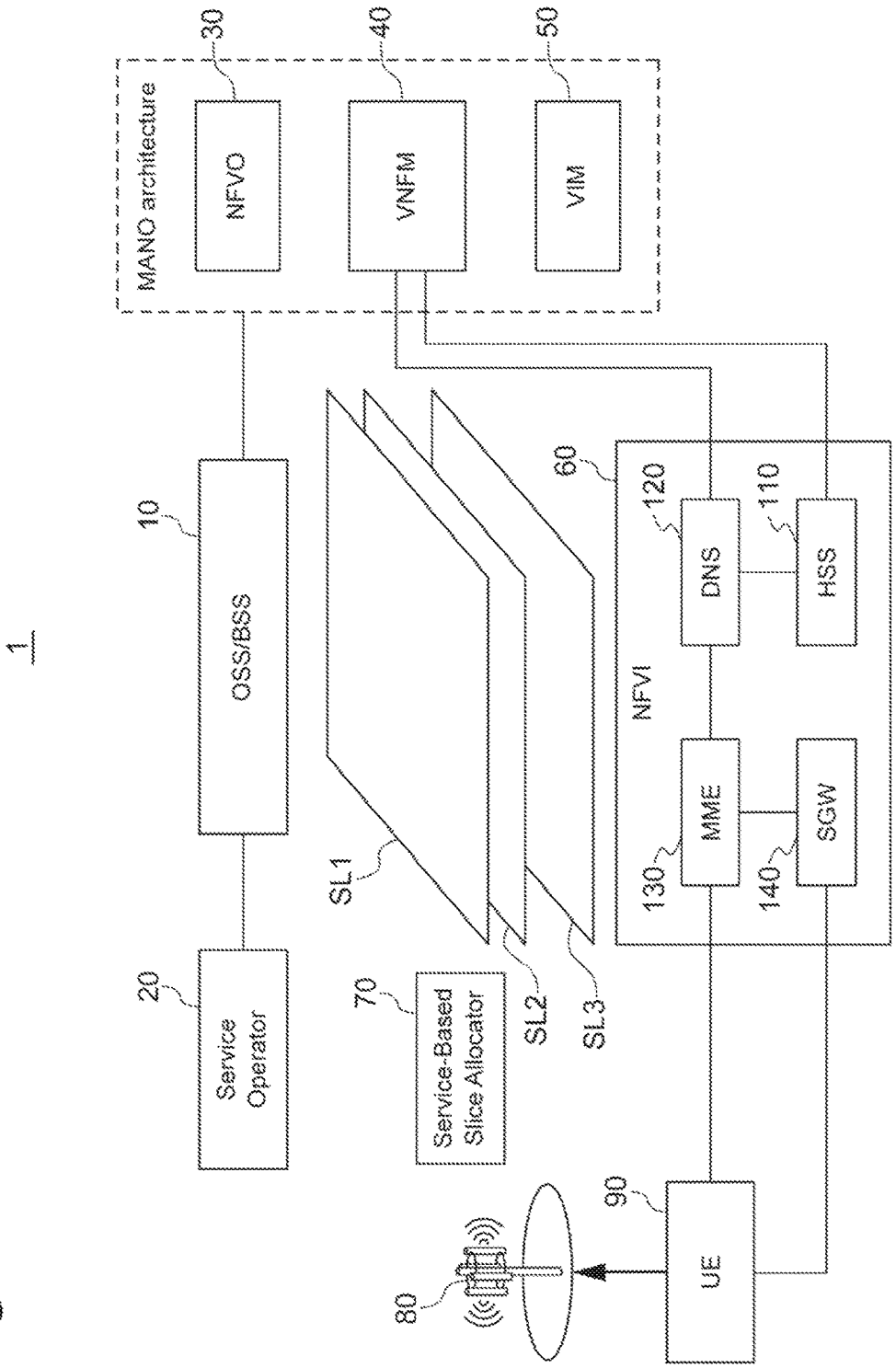
FIG. 1 is a diagram illustrating a configuration of a system according to an embodiment of the present invention.

Hereinafter, embodiments of a slice allocating method according to an embodiment of the present invention will be described in detail with reference to the drawings. In description of the drawings, the same elements are denoted by the same reference numerals, and repeated description will be omitted.

FIG. 1 illustrates a configuration of a system 1 including an OSS/BSS 10 and an NFVO 30 according to this embodiment. The system 1 is a system that allocates a service to a slice that is a virtual network. The slice is a virtual network or a service network that is logically generated on a network infrastructure by virtually separating resources of a link and a node of a network device, and combining the separated resources. The resources are separated between slices and do not interfere with each other. The service refers to a service that uses network resources, such as a communication service (for example, a dedicated line service) or an application service (moving image distribution, or a service using a sensor device such as an embedded device).

As illustrated in FIG. 1, the system 1 includes an operations support system/business support system (OSS/BSS) 10, a service operator (SO) 20, an NFVO 30, a VNFM 40, and a virtualized infrastructure management (VIM) 50. Further, the system 1 includes a network functions virtualization (NFV) infrastructure (NFVI) 60 which is a physical resource, a service-based slice allocator (SBSA) 70, a base station 80, a UE 90, a home subscriber server (HSS) 110, a domain name system (DNS) 120, a mobility management entity (MME) 130, and a serving gateway (SGW) 140. Among them, the NFVO 30, the VNFM 40, and the VIM 50 are management & orchestration (MANO) architecture.

These components constitute a core network of the system 1. The components in which information transmission and reception are necessary are connected to each other by cables or the like, such that transmission and reception of information can be performed.

The system 1 according to the embodiment provides a communication function to a mobile communication terminal using a virtual server that operates in a virtual machine realized on a physical server. That is, the system 1 is a virtualized mobile communication network. The communication function is provided to the mobile communication terminal by executing a communication process according to the communication function using the virtual machine.

The OSS/BSS 10 is a node that performs service management in the system 1 and performs an instruction related to the communication function in the system 1. For example, the OSS/BSS 10 may instruct the NFVO 30 to add a new communication function (communication service). Further, the OSS/BSS 10 can be operated by a communication operator related to the system 1.

The service operator (SO) 20 is a device that requests a service and is, for example, a terminal device (for example, a personal computer) of a business operator who provides a service to various users using a virtual network.

The NFVO 30 is an overall management node (functional entity) that performs management of the entire virtual network (slice) constructed on the NFVI 60 which is a physical resource The NFVO 30 receives an instruction from the OSS/BSS 10 and performs a process according to the instruction. The NFVO 30 performs management of an entire virtualized network constructed in physical resources of the infrastructure and a mobile communication network of a communication service. The NFVO 30 realizes the communication service provided by the virtual network at an appropriate place via the VNFM 40 and the VIM 50. For example, the NFVO 30 may perform service life cycle management (specifically, for example, generation, update, scale control, and event collection), resource distribution, reservation, and allocation management over a mobile communication network, service and instance management, and policy management (specifically, for example, optimum arrangement based on reservation and allocation of resources, geography, laws and regulations, or the like).

The VNFM 40 is a virtual communication function management node (functional entity) that adds a function related to a service to the NFVI 60 which is a physical resource (node). A plurality of VNFMs 40 may be provided in the system 1.

The VIM 50 is a physical resource management node (functional entity) that manages each physical resource (node) in the NFVI 60 to be described below. Specifically, The VIM 50 performs management of allocation, update and collection of resources, association of physical resources with a virtualized network, and management of a list of hardware resources and SW resources (hypervisor). Normally, the VIM 50 performs management on each data center (station office). The management of the physical resources is performed using a scheme according to the data center. The scheme for managing the data center (a scheme for mounting management resources) includes, for example, OPENSTACK and vCenter types. Normally, the VIM 50 is provided for each scheme for managing the data center. That is, a plurality of VIMs 50 that manage the physical resources in the NFVI 60 using different schemes are included. Units of the physical resources that are managed using different management schemes may not necessarily be data center units.

The NFVO 30, the VNFM 40, and the VIM 50 are realized by executing a program on a physical server device (here, the present invention is not limited to realization on virtualization, and may be realized on virtualization after a management system is separated). The NFVO 30, the VNFM 40, and the VIM 50 may be realized by separate physical server devices or by the same server device. (Programs for realizing) The NFVO 30, the VNFM 40, and the VIM 50 may be provided from separate vendors.

When the NFVO 30 receives a service allocation request from the OSS/BSS 10, the NFVO 30 issues a resource securing request for slices (slices SL1, SL2, and the like) to the VIM 50. When the VIM 50 secures the resources in a server device or a switch constituting the NFVI 60, the NFVO 30 defines a slice for the NFVI 60.

Further, when the NFVO 30 causes the VIM 50 to secure the resources in the NFVI 60, the NFVO 30 stores information in which the slice is defined for the NFVI 60, in a table stored in the NFVO 30. The NFVO 30 requests the VNFM 40 to install software for realizing a function required for a service. In response to the installation request, the VNFM 40 installs the above software in the NFVI 60 (a node such as a server device, a switch device, or a router device) secured by the VIM 50.

When the software is installed by the VNFM 40, the NFVO 30 associates the slice with the service in the table stored in the NFVO 30.

Figure 2:
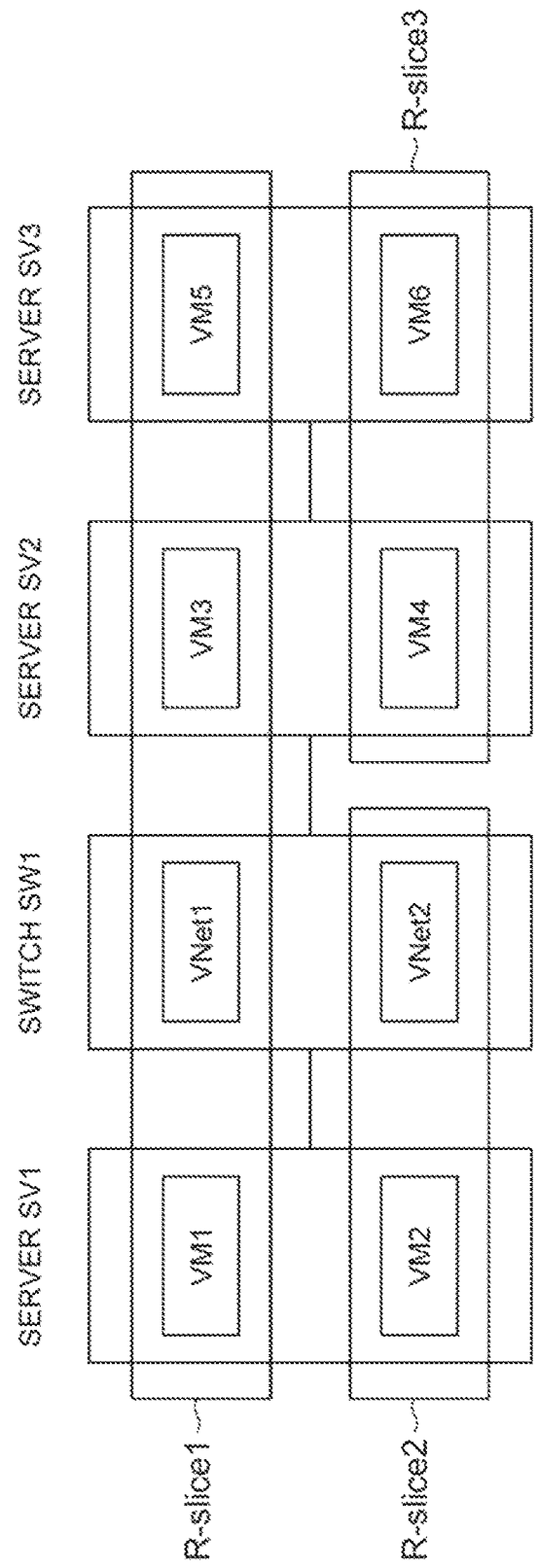
FIG. 2 is a diagram illustrating a correspondence relationship between a slice and a resource.

The slices SL1 to SL3 are service slices (hereinafter also referred to simply as "slices") serving as units of allocation of services. Further, there is a resource slice that defines resources constituting the service slice. By associating the resource slice with the service slice, resources constituting the service slice are determined. For example, as illustrated in FIG. 2, when the NFVO 30 requests the VIM 50 to secure resources for resource slices (resource slices R-slice 1 to R-slice 3), the VIM 50 instructs a server SV1, a switch SW1, a server SV2, and a switch SW2 to secure the resources. The NFVO 30 secures the resources of the server SV1, the switch SW1, the server SV2, and a server SV3 for the resource slice R-slice 1. Further, the NFVO 30 secures the resources of the server SV1 and the switch SW1 for the resource slice R-slice 2. Further, the NFVO 30 secures the resources of the server SV2 and the server SV3 for the resource slice R-slice 3.

When the NFVO 30 creates the resource slice and sets a function to the resources constituting the resource slice, the NFVO 30 determines the service slice that uses the resource slice.

When the NFVO 30 associates the resource slice with the service slice as described above, information in which the slice is associated with a function of the slice is stored as illustrated in FIG. 3(A) using a plurality of pieces of table information stored in the NFVO 30. For example, the NFVO 30 associates the service slice S-slice 1 with the resource slice R-slice 1 and associates the service slice S-slice 2 with the resource slices R-slice 2 and R-slice 3. Thus, the NFVO 30 associates the service slice with the resource slice according to an input operation from a user (administrator) of the NFVO 30.

FIG. 3A is a list based on the table stored in the NFVO 30. The list is a list in which a column "Service slice", a column "Resource slice", a column "Function set", and a column "Service Level Agreement (SLA)-Sufficiency Level (SL)" are associated, with each other, as illustrated in FIG. 3(A). Information (for example, S-slice 1) input to the column "Service slice" is an identifier indicating the service slice Information input to the column "Resource slice" is an identifier indicating the resource slice. Information indicating a function set is input to the column "Function set". Here, the function set is a set of functions of the resources of the resource slice. Information input to the column "SLA-SL" is a value obtained by indexing a function of each function included in the function set. The information is determined by referring to the information in which the function stored in the NFVO 30 in advance is associated with the index value of the function.

The NFVO 30 regularly transmits the information in a column "Service Slice" and the information in the column "SLA-SL" in the information illustrated in FIG. 3A to the OSS/BSS 10. The OSS/BSS 10 stores information in which the column "Service Slice" is associated with the column "SLA-SL". When the OSS/BSS 10 receives the service parameter and the service requirement from the SO 20 and receives the service request, the OSS/BSS 10 allocates the requested service to the service slice having the information in the column "SLA-SL" satisfying the service requirement by referring to the service requirement and the stored information in the column "SLA-SL", and stores an allocation result. A service parameter is information from which the service can be uniquely identified. FIG. 3(B) illustrates information that the OSS/BSS 10 stores as the allocation result. As illustrated in FIG. 3(B), information in which a column "Service parameter", a column "Service Slice", and a column "SLA-SL" are associated with each other is stored here, the column "Service parameter" is information for specifying a service for which the service request has been received from the SO 20, and is information that is received from the SO 20. The information in the column "Service Slice" and the information in the column "SLA-SL" are information that is received from the NFVO 30. The example of FIG. 3(B) shows that the service slice "S-slice 1" is allocated to service parameters "smart meter" and "road sensor" input to the column "Service parameter". The OSS/BSS 10 notifies the NFVO 30 of the service slice determined to be allocated and the service parameter. The NFVO 30 notifies the VNFM 40 of the service slice and the service parameter. The VNFM 40 sends an information rewrite request (editing request) to the device related to the allocation. When the editing is completed, the VNFM 40 transmits the service parameter to the SO 20.

The NFVI 60 indicates a network formed of physical resources (node group) constituting a virtualization environment. The physical resource thereof conceptually includes calculation resources, storage resources, and transmission resources. Specifically, the physical resources include nodes such as a physical server which is a physical server that performs a communication process in the system 1, and a switch. The physical server includes a CPU (a core or a processor a memory, and a storage means such as a hard disk. Normally, a plurality of nodes such as physical servers constituting the NFVI 60 are arranged at a base such as a data center (DC) In the data center, the arranged physical servers are connected by a network inside the data center such that transmission and reception of information to and from each other can be performed. Further, a plurality of data centers are provided in the system 1. The data centers are connected over a network, and the physical servers provided in different data centers can perform transmission and reception of information with each other via the network.

As described above, the NFVI 60 realizes functions of the HSS 110, the DNS 120, the MME 130, and the SGW 140 (communication control device) by the VNFM 40 adding various functions to the NFVI 60 that is the physical resources (node).

A SBSA 70 is a server device capable of communicating with the base station 80. When a service request is sent together with a service ID from the user equipment (UE) 90 to the base station 80, the base station 80 notifies the SBSA 70 of the service ID received from the UE 90.

When the SBSA 70 receives the service ID from the base station 80, the SBSA 70 transmits destination information of hardware providing an initial function of the service of access information corresponding to the service ID received from the base station 80 from the access information stored in the SBSA 70, to the base station 80. The base station 80 notifies the UE 90 of the destination information. Thereby, the UE 90 can specify a destination which the UE 90 initially accesses in order to use the service. The service parameters may be transmitted as information for access from the SO 20 to the UE 90.

The HSS 110 is a function of managing subscriber information including contract information, authentication information, communication service information, terminal type information, and location information of a communication terminal such as the UE 90 in a database. Here, the communication service information is information defining a type of communication service that is used by each UE 90. The communication service information includes information (for example, IMSI) for identifying the UE 90, and a service type indicating a requirement of the communication service that is used by the UE 90.

The DNS 120 is a function of managing a correspondence relationship between a domain name or a host name and an IP address on the network. Further, the DNS 120 stores information in which the service parameter is associated with an address of the SGW 140. When the DNS 120 receives an address transmission request from the MME 130, the DNS 120 transmits the address of the SGW 140 according to the request to the MME 130.

The MME 130 has a function of performing position management and authentication control of the user terminal (UE 90) located in a long term evolution (LTE) network, and a process of setting a communication route of user data between the SGW 140 and the UE 90.

The SGW 140 performs transmission and reception of user data that is used for providing a communication service with a packet data network gateway (PGW) using a function of a located packet switch that accommodates LTE. A plurality of SGWs 140 of provided to correspond to requirements or a plurality of communication services.

Subsequently, the functions according to this embodiment of the OSS/BSS 10, the NFVO 30, the VNFM 40, and the VIM 50 will be described with reference to FIG. 4.

Figure 4:
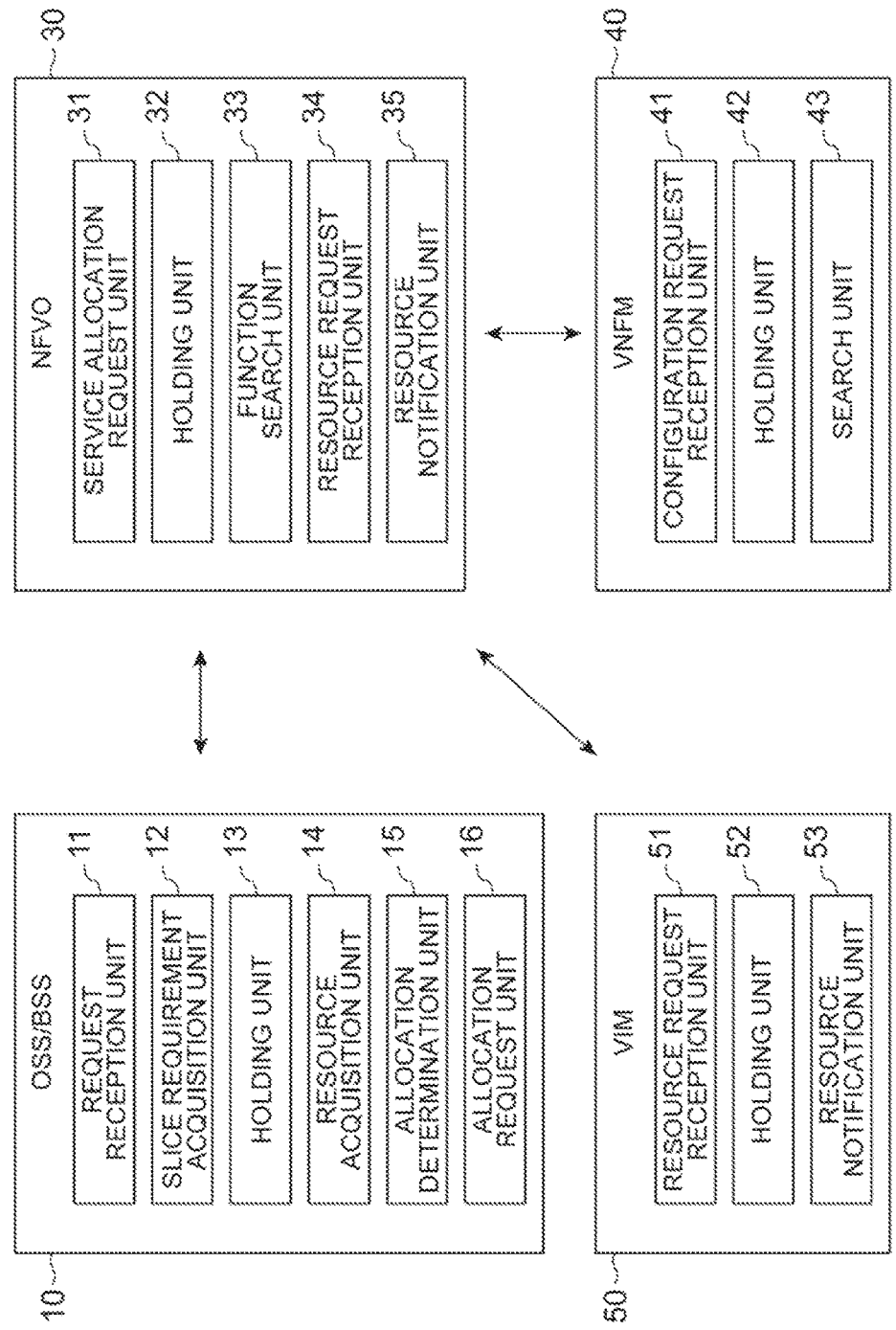
FIG. 4 is a block diagram of a device that is included in a system according to an embodiment of the present invention.
Figure 5:
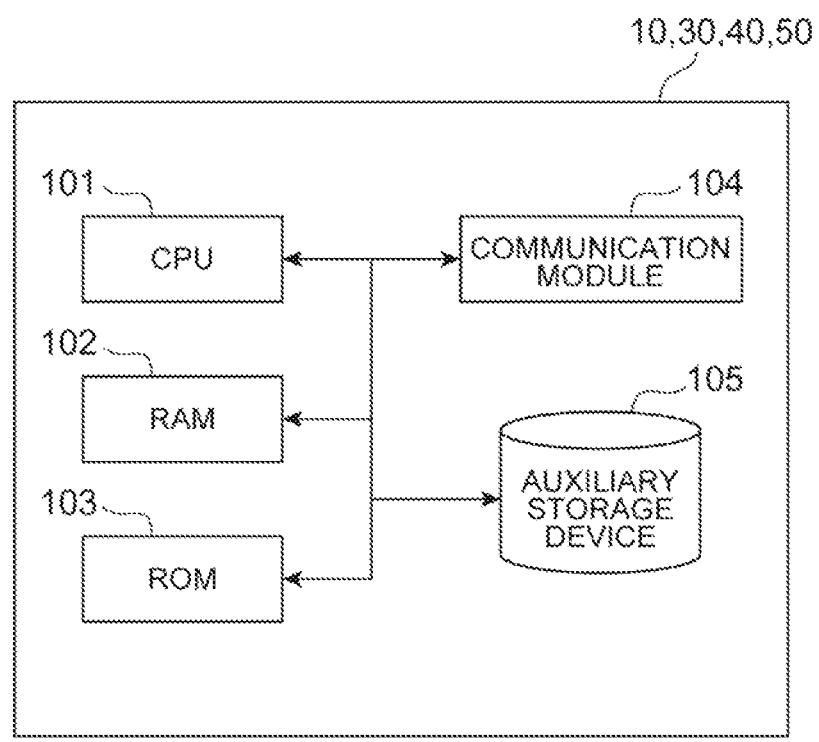

Physically, as illustrated in FIG. 5, each of the OSS/BSS 10, the NFVO 30, the VNFM 40, and the VIM 50 is configured as a computer system including a CPU 101, a RAM 102 and a ROM 103 as a main storage device, a communication module 104 as a data transmission and reception device, a hard disk, an auxiliary storage device 105 exemplified by a flash memory, and the like. In the OSS/BSS 10, the NFVO 30, the VNFM 40, and the VIM 50, the communication module 104 is operated under the control of the CPU 101 by causing predetermined computer software to be loaded on hardware such as the CPU 101 and the RAM 102 illustrated in FIG. 5, and reading and writing of data in the RAM 102 or the auxiliary storage device 105 are performed to realize a series of functions in each device. Referring back to FIG. 4, functions of the OSS/BSS 10, the NFVO 30, the VNFM 40, and the VIM 50 will be described.

As illustrated in FIG. 4, the OSS/BSS 10 includes a request reception unit 11, a slice requirement acquisition unit 12, a holding unit 13, a resource acquisition unit 14, an allocation determination unit 15, and an allocation request unit 16.

The request reception unit 11 is a unit that receives a service request including service requirements that are requirements of functions in a service from the SO 20. Here, among the service requirements, the functional requirement is a requirement regarding a function for executing the service. Specifically, necessity of mobility control, a possible access area range, and a service use time are included as the functional requirements. The necessity of mobility control means whether or not handover control is needed. The access area range means a range (area) in which a service is provided. The service use time means a time period in which the service is used.

Further, when the request reception unit 11 receives the service request, the request reception unit 11 receives information indicating the requirement of the function for realizing the service. SLA-SL, is the information indicating the requirement of the function for realizing the service referred to here.

When the request reception unit 11 receives the information indicating the requirement of the function for realizing the above service, the request reception unit 11 sends the service requirement to the allocation determination unit 15.

Further, the request reception unit 11 notifies the slice requirement acquisition unit 12 that the slice requirement is to be acquired.

When the request reception unit 11 detects that it is a predetermined resource status check timing, the request reception unit 11 notifies the resource acquisition unit 14 that the resource is to be acquired, and also notifies the allocation determination unit 15 that it is the check timing. Further, the request reception unit 11 notifies the slice requirement acquisition unit 12 that the slice requirement is to be acquired even when it is the resource status check timing.

The slice requirement acquisition unit 12 is a unit that acquires the requirement (SLA-SL) of each slice by referring to the slice service information illustrated in FIG. 3(B) stored in the holding unit 13. When the slice requirement acquisition unit 12 acquires the requirement of the slice, the slice requirement acquisition unit 12 sends the requirement of the slice to the allocation determination unit 15.

The holding unit 13 is a unit that stores various tables. The holding unit 13 stores a requested service management table and an allocation service table (FIG. 3(B)). FIG. 6 illustrates the requested service management table. This requested service management table is a table in which a column "Service parameter" is associated with a column "SLA-SL". Service parameters that the request reception unit 11 has received from the OSS/BSS 10 are input to the column "Service parameter". The SLA-SL that the request reception unit 11 has received from the OSS/BSS 10 is input to the column "SLA-SL". In addition to these two columns, a column "terminal information" is associated in the requested service management table. Terminal information that the request reception unit 11 has received from the OSS/BSS 10 is input to the column "terminal information".

When the resource acquisition unit 14 receives the resource acquisition request from the request reception unit 11, the resource acquisition unit 14 requests the NFVO 30 to acquire the resources. In response to the resource acquisition request, the resource acquisition unit 14 receives the resource information from the NFVO 30. The resource acquisition unit 14 notifies the allocation determination unit 15 of the resource information.

The allocation determination unit 15 is a unit that determines a slice corresponding to the service requirement of the service received by the request reception unit 11. For example, when the request reception unit 11 receives a service allocation request from the SO 20, the allocation determination unit 15 compares the SLA-SL received from the request reception unit 11 with the SLA-SL of the information of the allocation service table illustrated in FIG. 3(B) acquired from the slice requirement acquisition unit 12 to determine the service slice ID of the information of the allocation service table including all values of the SLA-SL received from the request reception unit 11 (which is equal to or greater than the value of the received SLA-SL). The allocation determination unit 15 requests the allocation request unit 16 to perform allocation when the same service parameter as the allocation target service parameter that is the allocation target has already been allocated and when the determined service slice ID is different from the service slice ID already allocated to the service parameter, by referring to the allocation service table. Further, the allocation determination unit 15 requests the allocation request unit 16 to perform the allocation when the same service parameter has not already been allocated by referring to the allocation service table.

Further, when the allocation determination unit 15 acquires the resource information from the resource acquisition unit 14, the allocation determination unit 15 determines the service slice to be allocated to the service parameter that is the allocation target on the basis of the SLA-SL corresponding to each service parameter in the requested service management table, the SLA-SL of the allocation service table, and the resource use status for each service slice acquired by the resource acquisition unit 14. Specifically, the allocation determination unit 15 determines that the service parameter is allocated to the service slice with a margin in the resource use status (with available resources) among the service slices that satisfy the SLA-SL corresponding to each service parameter in the requested service management table, by referring to the SLA-SL in the allocation service table. Here, the presence of the margin in the resource use status means that an average value of the usage of the resource for each slice (the VM constituting the slice, or hardware realizing the VM) is smallest. In this case, when the service slice determined this time is different from the previously allocated service slice, the allocation request unit 16 is requested to allocate the service slice. When the allocation request unit 16 is requested to allocate the service slice, the allocation determination unit 15 notifies of the terminal information, the service parameter, and the service slice to be allocated.

The allocation request unit 16 is a unit that reallocates the service to the determined slice when the service that is an allocation target is associated with the slice in advance. The allocation request unit 16 transmits the terminal information, the service parameter, and the service slice to be allocated received from the allocation determination unit 15 to the NFVO 30, and makes an allocation request. Further, the allocation request unit 16 updates the allocation service table so that the service parameter that is an allocation target is associated with the service slice that is an allocation destination. When the allocation request unit 16 newly allocates the service slice to a service parameter, the allocation request unit 16 registers the service parameter, the SLA-SL, and the terminal information in the requested service management table.

Next, a function of the NFVO 30 will be described. The NFVO 30 includes a service allocation request unit 31, a holding unit 32, a function search unit 33, a resource request reception unit 34, and a resource notification unit 35.

The service allocation request unit 31 is a unit that receives the allocation request from the OSS/BSS 10 and requests the VNFM 40 to perform allocation in response to the allocation request. Specifically, the service allocation request unit 31 receives the terminal information, the service parameter, and the service slice ID from the OSS/BSS 10, and receives the allocation request. Further, the service allocation request unit 31 transmits the service slice ID to the function search unit 33. Further, the service allocation request unit 31 receives a function search result from the function search unit 33. The service allocation request unit 31 transmits the service parameter, the terminal information, the service slice ID, and the function search result to the VNFM 40 to request the VNFM 40 to allocate the service.

The holding unit 32 is a unit that stores various tables. The holding unit 32 stores a function set table and a function requirement table. FIG. 7 illustrates a function set table. This function set table is a table for storing information in which a column "S-Slice ID", a column "R-Slice ID", and a column "Function Set" are associated with one another. The service slice ID for identifying the service slice is input to the column "S-Slice ID". A resource slice 10 for identifying the resource slice is input to the column "R-Slice ID" Information indicating the function set is input to the column "Function Set". FIG. 8 illustrates the function requirement table. The function requirement table is a table for storing information in which a column "Function" is associated with a column "SLA-SL". Information indicating a function is input to the column "Function" illustrated in FIG. 8. Information indicating the SLA-SL corresponding to the function is input to the column "SLA-SL".

The function search unit 33 is a unit that searches for the function set corresponding to the service slice ID. When the function search unit 33 receives the service slice ID from the service allocation request unit 31, the function search unit 33 searches for the function set table using the service slice ID as a search key. The function search unit 33 notifies the service allocation request unit 31 of a result of the search (the function set).

When the resource request reception unit 34 receives the resource request from the OSS/BSS 10, the resource request reception unit 34 acquires the function set from the function set table of the holding unit 32. The resource request reception unit 34 transmits respective, functions in the function set to the VNFM 40 to request the VNFM 40 to acquire a VM. The resource request reception unit 34 acquires the VM from the VNFM 40. Subsequently, the resource request reception unit 34 requests the VIM 50 to transmit the resource use status of each VM. When the resource request reception unit 34 receives the resource use status from the VIM 50, the resource request reception unit 34 notifies the resource notification unit 35 of the resource use status for each service slice.

The resource notification unit 35 transmits the resource use status received from the resource request reception unit 34 to the OSS/BSS 10 for each service slice.

Next, the VNFM 40 will be described. The VNFM 40 includes a configuration request reception unit 41, a holding unit 42, a search unit 43, and an editing request unit 44. The configuration request reception unit 41 is a unit that receives the VM acquisition request from the NFVO 30. When the configuration request reception unit 41 receives the VM acquisition request together with the target function from the NFVO 30, the configuration request reception unit 41 notifies the search unit 43 of the target function. After the configuration request reception unit 41 notifies the search unit 43 of the target function, the configuration request reception unit 41 acquires the search result of the search unit 43 from the search unit 43. When the configuration request reception unit 41 acquires the search result from the search unit 43, the configuration request reception unit 41 transmits the search result to the NFVO 30.

Figure 11:
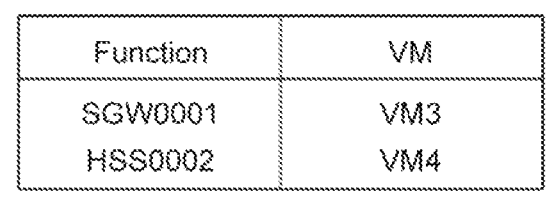

The holding unit 42 is a unit that holds various types of information. The holding unit 42 holds software (for example, a repository). In addition to the above software, the holding unit 42 also stores a VM function table having information in which the VM is associated with the function. FIG. 11 illustrates an example of the VM function table. As illustrated in FIG. 11, a column "Function", a column "VM", and a column "Address" indicating an address of the "VM" (not illustrated) are stored in association with one another. Information indicating the function is input to the column "Function". Information indicating a VM that executes the function (for example, an identifier of the VM) is input to the column "VM".

The search unit 43 is a unit that searches for the VM function table of the holding unit 42 in response to a request from the configuration request reception unit 41 and notifies the configuration request reception unit 41 of a result of the search. When the search unit 43 receives the target function from the configuration request reception unit 41, the search unit 43 searches for the VM function table, and transmits "VM" having information in the column "Function" matching the target function as a search result to the configuration request reception unit 41.

The editing request unit 44 is a unit that receives an editing request from the NFVO 30 and requests the HSS 110 and the DNS 120 to perform editing in response to the editing request. The editing request unit 44 receives a function set (function list), the terminal information, the service slice ID, and the service parameter from the NFVO 30, and also receives the editing request. The editing request unit 44 transmits the terminal information, the service slice ID, and the service parameter, and requests the HSS 110 to perform editing. Here, an example of the information stored in the HSS 110 is illustrated in FIG. 9. As illustrated in FIG. 9, the HSS 110 stores information in which a column "User ID" is associated with a column "Service parameter" in response to the editing request. Information for identifying the user, for example, information such as IMSI is input to the column "User ID". The service parameter is input to the column "Service parameter".

Further, the editing request unit 44 searches for the VM function table using information indicating the SGW as a search key among the function sets received from the NFVO 30, and acquires the address of the SGW. The editing request unit 44 transmits the address and the service parameter to the DNS 120 and requests the DNS 120 to perform editing. Here, an example of information stored in DNS 120 is illustrated in FIG. 10. As illustrated in FIG. 10, the DNS 120 stores information in which the column "Service parameter" is associated with a column "IP Address" in response to the editing request. The service parameter is input to the column "Service parameter". Address information indicating an access destination is input to the "IP Address" column. When the DNS 120 receives the editing request, the DNS 120 newly registers the service parameter and the address information when information on the service parameter that is a request target has not been input. When the service parameter has already been registered, the address information corresponding to the service parameter is changed to the address information of the request target.

The VIM 50 includes a resource request reception unit 51, a holding unit 52, and a resource notification unit 53. The resource request reception unit 51 is a unit that receives a request for a resource status together with a target VM from the NFVO 30. When the resource request reception unit 51 receives the resource status request, the resource request reception unit 51 searches for information of the holding unit 52 using the target VM as a search key. The resource request reception unit 51 notifies the resource notification unit 53 of a result of the search.

Figure 13:
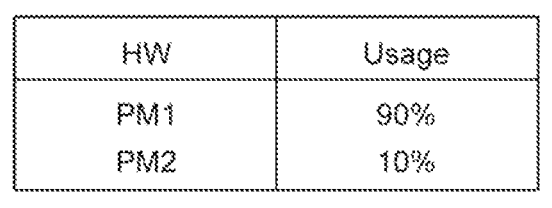

The holding unit 52 is a unit that stores resource information. Usage information of the VM and usage information of the hardware that realizes the VM are stored as the resource information. FIG. 12 illustrates an example of the usage information, of the VM. As illustrated in FIG. 12, information in which the column "VM", a column "Affiliation HW", and a column "Usage" are associated with one another is stored information indicating the VM (for example, an identifier of the VM) is input to the column "VW". Information indicating hardware (for example, a server) (for example, an identifier of the server) that realizes the VM is input to the column "Affiliation HW". Information indicating a usage of the VM is input to the column "Usage". Next, an example of the usage information of the hardware is illustrated in FIG. 13. As illustrated in FIG. 13, information in which the column "HW" and the column "Usage" are associated with each other is stored. Information for identifying the hardware is input to the column "HW". Information indicating the usage of hardware is input to the column "Usage".

The resource notification unit 53 is a unit that receives the search result from the resource request reception unit 51 and transmits the search result to the NFVO 30.

Figure 14:
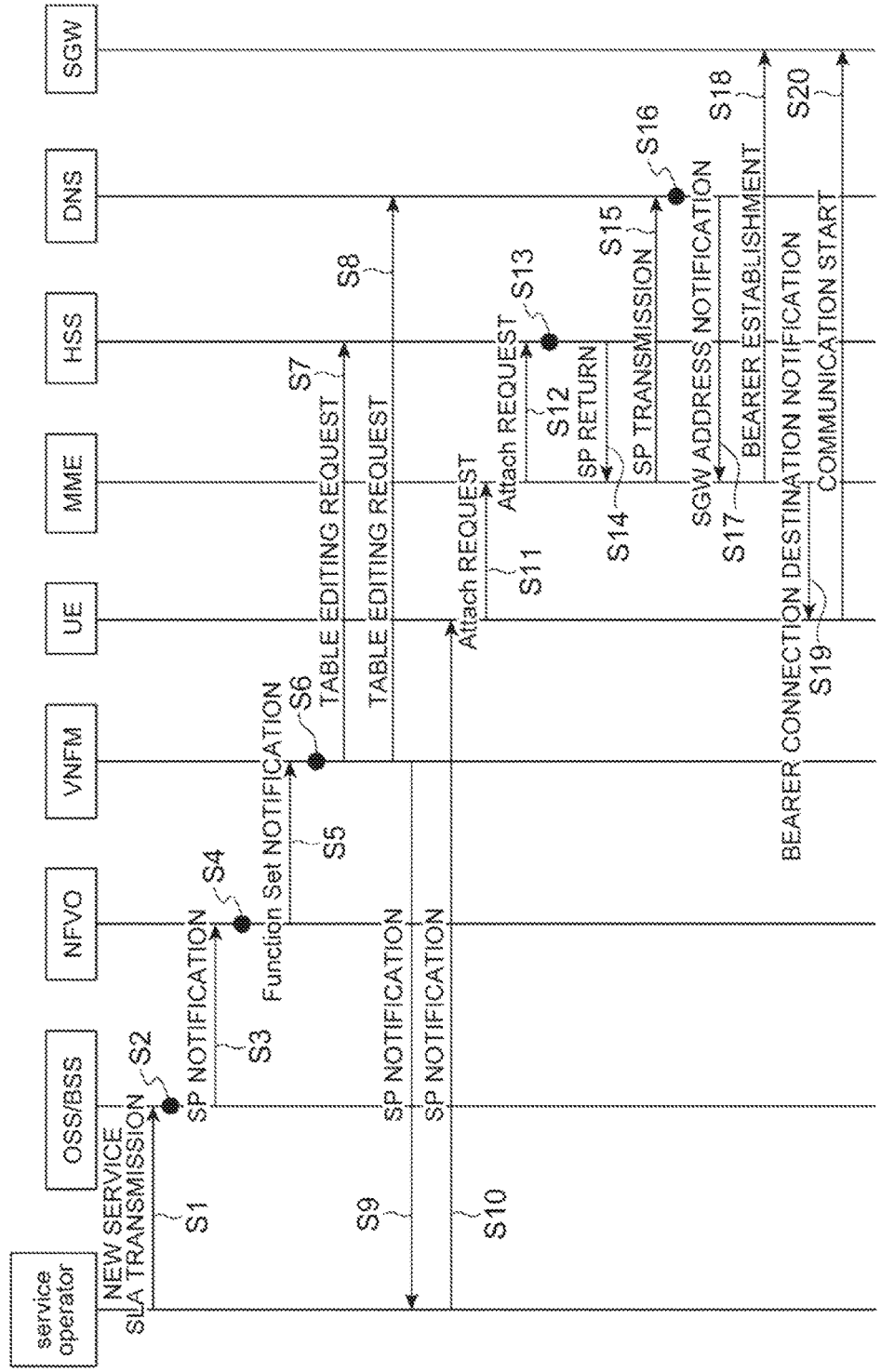
FIG. 14 is a sequence diagram illustrating a new service process.

Subsequently, a process that is executed by the system 1 according to the embodiment will be described with reference to a sequence diagram of FIG. 14. Here, as an example, it is assumed that there is a service allocation request in a fixed mode (mobility of SLA-SL="1") in a service for distributing an operation in a screen mounted vehicle from the SO 20 to the OSS/BSS 10.

The SO 20 transmits a service parameter indicating the operation distribution service, SLA-SL, and terminal information of the UE 90 that uses the service to the OSS/BSS 10, and sends a service allocation request (step S1). The request reception unit 11 of the OSS/BSS 10 receives the service parameter, the SLA-SL, and the terminal information and also receives the service allocation request. When the request reception unit 11 receives the service allocation request, the slice requirement acquisition unit 12 acquires information from the allocation service table illustrated in FIG. 3(B) stored in the holding unit 13. The allocation determination unit 15 determines a slice ID that satisfies the received by referring to the SLA-SL of the allocation service table acquired by the slice requirement acquisition unit 12. Here, since the mobility of the SLA-SL is "1", it is determined that the service is allocated to the slice with the slice ID of "1" when other requirements are also satisfied (step S2). Subsequently, the allocation request unit 16 transmits the service slice ID, the service parameter, and the terminal information to the NFVO 30 (step S3). The service allocation request unit 31 of the NFVO 30 receives the service slice ID, the service parameter, and the terminal information, and also receives the service allocation request. The function search unit 33 of the NFVO 30 searches for the function set table using the received service slice ID as a search key, and searches for a function set corresponding to the service slice ID (step S4). The service allocation request unit 31 of the NFVO 30 transmits the service slice ID, the service parameter, the terminal information, and the function set to the VNFM 40 (step S5). The editing request unit 44 searches for the VM function table in the function set received from the NFVO 30 using the information indicating the SGW as a search key, and acquires the address of the SGW (step S6). The editing request unit 44 of the VNFM 40 receives the editing request from the NFVO 30, transmits the terminal information, the service slice ID, and the service parameter, and sends an editing request to the HSS 110 (step S7). The editing request unit 44 transmits the address and the service parameter to the DNS 120, and sends an editing request (step S8).

Further, when the editing request unit 44 of the VNFM 40 receives an editing completion notification from the HSS 110 and the DNS 120, the editing request unit 44 of the VNFM 40 transmits a service parameter registration completion notification to the SO 20 (step S9). When the SO 20 receives the registration completion notification, the SO 20 notifies the UE 90 of the service parameter (step S10). When the UE 90 uses the service, the 90 sends an Attach request to the predetermined MME 130 (step S11). The MME 130 sends an Attach request to the HSS 110 (step S12). The HSS 110 receives the Attach request and searches for a service parameter corresponding to the UE 90 that sends the Attach request (step S13). The HSS 110 returns the service parameter that has been searched for to the MME 130 (step S14). The MME 1130 transmits the service parameter to the DNS 120 and searches for an address corresponding to the service parameter (step S16). The DNS 120 transmits the address that has been searched for to the MME 130 (step S17). The MME 130 receives the address, connects to the SGW 140 with the received address, and establishes a bearer (step S18). The MME 130 notifies the UE 90 of a bearer connection destination (step S19). The UE 90 accesses the connection destination received from the MME 130 and starts communication of the service data (step S20).

Although the case in which the MME 130 receives the service parameter from the HSS 110 has been described in the sequence diagram described above, the service parameter may be received from the UE 90 in step S11.

Figure 15:
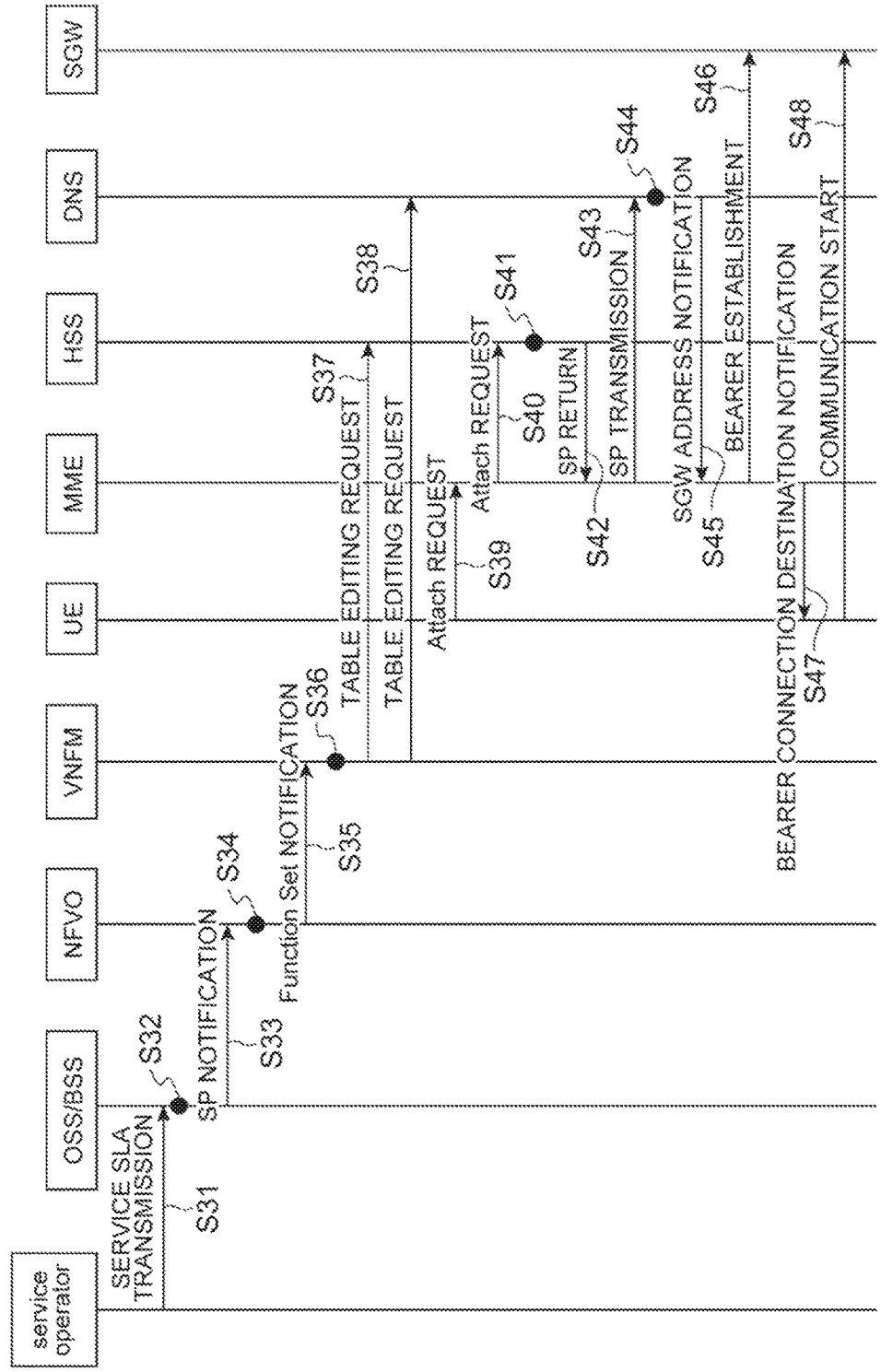
FIG. 15 is a sequence diagram illustrating a service reallocation process.

Next, a process that is executed by the system 1 according to the embodiment will be described with reference to a sequence diagram of FIG. 15. Here, as an example, it is assumed that there is a service allocation request from the SO 20 to the OSS/BSS 10 in a movement mode (mobility of SLA-SL is "3") in a screen mounted vehicle.

The SO 20 transmits the service parameter and the SLA-SL to the OSS/BSS 10 and sends a service allocation request (step S31). The request reception unit 11 of the OSS/BSS 10 receives the service parameter and the SLA-SL and receives the service allocation request. When the request reception unit 11 receives the service allocation request, the slice requirement acquisition unit 12 acquires information from the allocation service table illustrated in FIG. 3(B) stored in the holding unit 13. The allocation determination unit 15 determines a slice ID that satisfies the received SLA-SL by referring to the SLA-SL of the allocation service table acquired by the slice requirement acquisition unit 12. Here, since the mobility of the SLA-SL is "3", it is determined that the service is allocated to the slice with the slice ID of "2" input to the column "S-slice ID" when other requirements are also satisfied (step S32). Further, the allocation determination unit 15 confirms whether or not the same service parameter as a service parameter that is an allocation target is stored in the allocation service table (whether or not the service parameter that is the allocation target is stored in the allocation service table). Since the information including the service parameter has already been stored and associated with another service slice ID, the allocation determination unit 15 updates the allocation service table so that the service parameter that is an allocation target is associated with the service slice of an allocation destination. Thus, when the mobility of the SLA-SL increases, the service is allocated to a slice different from the previously allocated slice.

Processes of steps S33 to S38 are the same as the processes of steps S3 to S8, respectively, and description thereof is omitted. Since the UE 90 has already been notified of the service parameter, the processes corresponding to steps S9 and S10 are not performed. Processes from steps S39 to S48 are the same as the processes of step S11 to S20, respectively, and description is omitted. As described above, by allocating the service to a slice different from a previously allocated slice, the SGW 140 that transmits and receives data for using the service is changed (steps S33 to S38).

Next, a process that is executed in the system 1 according to the embodiment will be described with reference to a sequence diagram of FIG. 16. Here, a processing method of allocating a service slice on the basis of a status of resources at a predetermined timing will be described.

At a predetermined timing, the resource acquisition unit 14 of the OSS/BSS 10 transmits the slice ID and the function set of the slice to the NFVO 30 and requests a resource use status (step S51). The resource request reception unit 34 of the NFVO 30 requests the VNFM 40 to provide the VM corresponding to the function set, and the configuration request reception unit 41 of the VNFM 40 receives the request and notifies the NFVO 30 of each VM of the above function set (step S52). The resource request reception unit 34 of the NFVO 30 requests the VIM 50 to acquire the resource use status (step S53). When the resource request reception unit 51 of the VIM 50 receives the resource request, the resource request reception unit 51 of the VIM 50 searches for the information stored in the holding unit 52, and the resource notification unit 53 notifies the NFVO 30 of the usage of each VM. The resource notification unit 35 of the NFVO 30 transmits the use status of the VM constituting the function set for each slice to the OSS/BSS 10 (step S54). The allocation determination unit 15 of the OSS/BSS 10 determines the slice to be allocated on the basis of the SLA-SL of each slice and the use status of the VM of the function set for each slice (step S55). Specifically, the allocation determination unit 15 specifies a record of the allocation service table having the SLA-SL satisfying the SLA-SL of the service parameter stored in the requested service management table, and determines that the service is allocated to the service slice having a largest number of available resources among the service slices indicated by the record. The allocation request unit 16 notifies the NFVO 30 of the service slice ID alter the allocation, the service parameter, and the terminal information (step S56). Since steps S57 to S59, S61, and S62 are the same as steps S4 to S6, S7, and S8, respectively, the description thereof will be omitted. The VNFM 40 transmits the terminal information to the MME 130 (step S60). Further, the MME 130 notifies each UE 90 of the MME 130 of an access destination (step S63). Since the processes of steps S63 to S72 are the same as the processes of steps S11 to S20, respectively, description thereof will be omitted. The processes of steps S55 and S56 described above are executed only when the MME of the connection destination is changed by charming the service slice ID.

Figure 16:
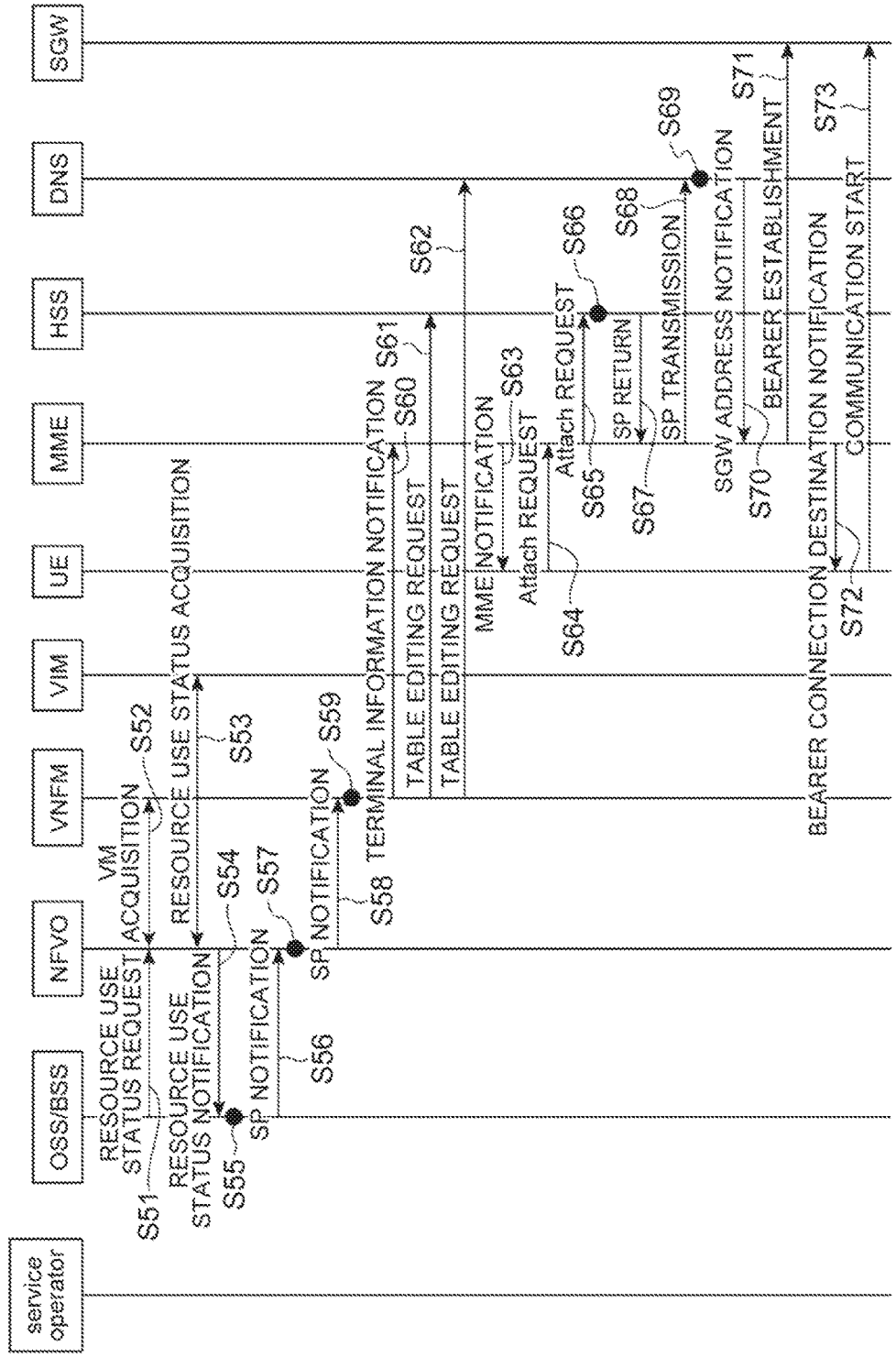
FIG. 16 is a sequence diagram illustrating a service reallocation process based on resources.

Although the case in which the OSS/BSS 10 regularly sends the request for acquisition of the information on the resource use status has been described in the sequence of FIG. 16, the NFVO 30 may monitor a hardware resource use status (VM usage or hardware usage), and the NFVO 30 may acquire information on the resource use status for each slice similar to the above sequence at the timing at which the resource use status exceeds a certain value (for example, 90%), transmit the information to the OSS/BSS 10, and send a service allocation change request.

Next, an operation and an effect of the system 1 of the embodiment will be described. The OSS/BSS 10 holds the information of the allocation service table in which the service to which the slice has been allocated is associated with the slice. Further, the request reception unit 11 of the OSS/BSS 10 receives the SLA-SL which is a requirement of the function. The allocation determination unit 15 determines a slice having an SLA-SL (satisfying the service requirement) corresponding to the service requirement (SLA-SL) of the received service. When the service that is an allocation target has been associated with the slice in advance, the allocation request unit 16 reallocates the service to the determined slice.

In this case, since the system 1 reallocates the service to the slice that satisfies the service requirement when the allocation request is received, the service can be reallocated to a slice that satisfies a changed service requirement if a service requirement has changed. Thus, it is possible to dynamically change the slices to be allocated to correspond to a service requirement that has dynamically changed, and to provide an appropriate service.

Further, in the system 1, the allocation request unit 16 transmits the terminal information received from the allocation determination unit 15, the service parameter, and the service slice to be allocated, to the NFVO 30 and sends an allocation request. In response to the allocation request, the NFVO 30 causes the VNFM 40 to change the address of the SGW corresponding to the service parameter. Thus, by the allocation request unit 16 sending the allocation request, the communication control device that transmits and receives data for using the service is changed. Therefore, since the communication control device that transmits and receives data of the service is switched according to the service requirement, it is possible to provide a suitable service to a user who uses the service.

Further, the resource acquisition unit 14 acquires the resource status for each slice at a predetermined timing. The slice requirement acquisition unit 12 specifies the SLA-SL of each slice together with the service requirement of the service to which the slice has already been allocated. The allocation determination unit 15 determines the slice to be allocated on the basis of the service requirement of the service, the SLA-SL of each slice, and the resource status.

In this case, since the slice to be allocated to the service is determined in consideration of the status information of the resources, an appropriate slice can be dynamically allocated even when the resource status fluctuates.

The allocation determination unit 15 determines a slice having a largest number of available resources among the slices that satisfy the service requirement. In this case, since the service is allocated to the slice of the resource having the largest number of available resources, it is possible to effectively utilize the resources.

The software should be broadly construed to mean an instruction, an instruction set, a code, a code segment, a program code, a program, a subprogram, a software module an application, a software application, a software package, a routine, a subroutine, an object, an executable file, an execution thread, a procedure, a function, or the like whether the software is called software, firmware, middleware, microcode, hardware description language, or any other name.

Further, the software, the instructions, or the like may be transmitted and received via a transmission medium. For example, when the software may be transmitted from a website server, or other remote sources using a wired technology such as a coaxial cable, a fiber optic cable, a twisted pair, or a digital subscriber line (DSL) and/or a wireless technology such as infrared, wireless, and microwaves, the wired and/or wireless technology is included within a definition of the transmission medium.

The information, the signal, or the like described in the specification may be represented using any one of a variety of different technologies. For example, data, an instruction, a command, information, a signal, a bit, a symbol, a chip, or the like that may be mentioned throughout the above description may be represented by a voltage, a current, electromagnetic waves, a magnetic field or particles, an optical field or photons, or a combination thereof.

The terms described in the specification and/or terms necessary for understanding of the specification may be replaced with terms having the same or similar meanings. For example, a channel and/or a symbol may be a signal. Further, the signal may be a message. Further, a component carrier (CC) may be referred to as a carrier frequency, a cell, or the like.

The terms "system" and "network" used in the specification are used interchangeably.

Further, the information, the parameters, and the like described in the specification may be represented by an absolute value, may be expressed as a relative value with respect to a predetermined value, or may be represented by other corresponding information. For example, wireless resources may be indicated by an index.

Names used for the above parameters are not limited in any respect. Further, an equation or the like using the parameters may be different from those explicitly disclosed in the specification. Since various channels (for example, PUCCH and PDCCH) and information elements (for example, TPC) cart be identified by any suitable names, various names allocated to various channels and information elements are not limited in any respect.

The base station can accommodate one or a plurality of (for example, three) cells (also called a sector). When the base station accommodates the plurality of cells, an entire coverage area of the base station can be divided into a plurality of smaller areas, and each smaller area can provide communication services using a base station subsystem (for example, an indoor small base station RRH (Remote Radio Head). The term "cell" or "sector" refers to a part or all of a coverage area of a base station and/or a base station subsystem that performs a communication service in a coverage thereof. Further, the terms "base station" "eNB", "cell", and "sector" may be used interchangeably in the specification. The base station may also be referred to by terms such as a fixed station, a Node B, an eNode B (eNB), an access point, a femtocell, and a small cell.

A mobile station may be referred to by a term such as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term by those skilled in the art.

Further, the term "determining" used in the specification can include a wide variety of operations. The "determining" can include considering, for example, judging, calculating, computing, processing, deriving, investigating, looking up (looking up, for example, a table, a database, or another data structure), and ascertaining as "determining". Further, "determining" may also include considering "receiving" (for example, receiving information), transmitting (for example, transmitting information), input, output, accessing (for example, accessing data in a memory) as "determining". Further, "determining" may also include considering resolving, selecting, choosing, establishing, comparing, or the like as "determining". That is, "determining" may include considering any operation as "determining".

Terms "connected", "coupled", or any variation thereof, mean any direct or indirect connection or coupling between two or more elements, and may include the presence of one or a plurality of intermediate elements between two "connected" or "coupled" elements. The coupling, or connection between the elements may be a physical coupling or connection, may be a logical coupling or connection, or may be a combination thereof. It is conceivable that as used in the specification, two elements are "connected" or "coupled" to each other by using one or more wires, cables, and/or electrical printed connections, and by using electromagnetic energy, such as electromagnetic energy having wavelengths in a radio frequency range, a microwave range, and a (both visible and non-visible) light range as some non-limiting and non-inclusive examples.

The phrase "on the basis of" used in the specification does not mean "on the basis of only" unless explicitly stated otherwise. In other words, the phase "on the basis of" means both of "on the basis of only" and "on the basis of at least".

Further, a "means" in the configuration of each device may be replaced with "unit", "circuit", "device", or the like.

As long as "including", "comprising", and variations thereof are used in the specification or the claims, these terms are intended to be inclusive, like the term "comprising". Further, the term "or" used in the specification or the claims is intended not to be an exclusive OR.

The notification of information is not limited to the aspect/embodiment described in the specification and may be performed in other ways. For example, the notification of the information may be implemented by physical layer signaling (for example, downlink control information (DCI) or uplink control information (UCI), upper layer signaling (for example, radio resource control (RRC) signaling, medium access control (MAC) signaling, notification information (master information block (MIB), or system information block (SIB)), other signals, or a combination thereof. Further, the RRC signaling may be called an RRC message and may be, for example, an RRC connection setup message, an RRC connection reconfiguration message, or the like.

Further, each aspect/embodiment described in the specification can be applied to long term evolution (LTE), LTE-Advanced (LTE-A), SUPER3G, IMT-Advanced, 4G, 5G, future radio access (FRA), W-CDMA (registered trademark), GSM (registered trademark), CDMA 2000, an ultra mobile broadband (UMB), IEEE 802.11 (Wi-Fi), IEEE 802.16 (WiMAX), IEEE 802.20, ultra-wide band (UWB), Bluetooth (registered trademark), a system that uses another appropriate system, and/or a next generation system developed on the basis of such systems.

Further, an order of a processing procedure, sequence, flowchart, and the like of each aspect/embodiment described in the specification may be interchanged as long as there is no inconsistency. For example, for the methods described in the specification, elements of various steps are presented in an exemplary order and are not limited to the specific presented order.

Further, in the specification, a specific operation that is performed by the base station may be performed by an upper node with respect thereto in some cases. In a network including one or a plurality of network nodes having a base station, it is obvious that various operations that are performed for communication with a terminal may be performed by a base station and/or a network node other than the base station (for example, an MME, an S-GW, or the like is conceivable, but the present invention is not limited thereto). Although a case in which there is one network node other than the base station is illustrated in the above example, a combination of a plurality of other network nodes (for example, the MME and the S-GW) may be used.

The above information or the like can be output from an upper layer (or a lower layer) to the lower layer (or the upper layer). The information may be input or output via a plurality of network nodes.

The input and output information or the like may be stored in a specific place (for example, a memory) or may be managed in a management table. The input and output information or the like can be overwritten, updated, or appended. The output information or the like may be deleted. The input information or the like may be deleted. The input information or the like may be transmitted to another device.

The determination may be performed using a value (0 or 1) represented by 1 bit, may be performed using a Boolean value (true or false), or may be performed through a comparison between numerical values (for example, a comparison with a predetermined value).

Each aspect/embodiment described in the specification may be used singly, may be used in combination, or may be switched according to execution. Further, notification of predetermined information (for example, notification of "being X") is not limited to being performed explicitly, and may be performed implicitly (for example, notification of predetermined information is not performed).

Throughout the present disclosure, both singular and plural are included unless singular is clearly indicated.

Although the present invention has been described in detail above, it will be obvious to those skilled in the art that the present invention is not limited to the embodiments described in the specification. The present invention can be implemented as a modification and modification aspects without departing from the spirit and scope of the present invention as defined by the claims. Therefore, the description of the specification is intended for illustration and does not have any restrictive meaning with respect to the present invention.

REFERENCE SIGNS LIST

1 System
10 OSS/BSS
11 Request reception unit
12 Slice requirement acquisition unit
13 Holding unit
14 Resource acquisition unit
15 Allocation determination unit
16 Allocation request unit
20 SO
30 NFVO
31 Service allocation request unit
32 Holding unit
33 Function search unit
34 Resource request reception unit
35 Resource notification unit
40 VNFM
41 Configuration request reception unit
42 Holding unit
43 Search unit
44 Editing request unit
50 VIM
51 Resource request reception unit
52 Holding unit
53 Resource notification unit
60 NFVI
70 SBSA
80 Base station
90 UE
101 CPU
102 RAM
103 ROM
104 Communication module
105 Auxiliary storage device

The invention claimed is:

1. A service allocation determining method executed by a device that allocates a service that uses a virtual network to a slice, the slice being the logical generation of the virtual network on a network infrastructure,
   wherein the service to which the slice is allocated is associated with the slice in the device, and
   the method comprises
   a determination step of determining a slice that satisfies a service requirement that is a requirement of a function in a service that is an allocation target; and
   an allocation step of reallocating, when the service that is the allocation target is associated with a first slice by the device in advance, the service that is the allocation target to a second slice satisfying the service requirement that is a requirement of a function in the service that is the allocation target.

2. The service allocation determining method according to claim 1, wherein the service that is the allocation target is reallocated by changing a communication control device that transmits and receives data for using the service.

3. The service allocation determining method according to claim 1, further comprising:
   an acquisition step of acquiring a resource status for each slice and the service requirement of the service to which the slice has already been allocated,
   wherein the determination step determines the slice to be allocated on the basis of the service requirement and the resource status acquired in the acquisition step.

4. The service allocation determining method according to claim 3, wherein the determination step determines the slice to be allocated as having a largest number of available resources among slices satisfying the service requirement.

5. The service allocation determining method according to claim 2, further comprising:
   an acquisition step of acquiring a resource status for each slice and the service requirement of the service to which the slice has already been allocated,
   wherein the determination step determines the slice to be allocated on the basis of the service requirement and the resource status acquired in the acquisition step.

6. The service allocation determining method according to claim 5, wherein the determination step determines the slice to be allocated as having a largest number of available resources among slices satisfying the service requirement.

* * * * *